US011861642B2

(12) United States Patent
Carbune et al.

(10) Patent No.: US 11,861,642 B2
(45) Date of Patent: Jan. 2, 2024

(54) GROUP ACTION FULFILLMENT ACROSS MULTIPLE USER DEVICES

(71) Applicant: Google LLC, Mountain View, CA (US)

(72) Inventors: Victor Carbune, Zurich (CH); Matthew Sharifi, Kilchberg (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/865,051

(22) Filed: Jul. 14, 2022

(65) Prior Publication Data

US 2022/0351227 A1    Nov. 3, 2022

Related U.S. Application Data

(63) Continuation of application No. 17/004,851, filed on Aug. 27, 2020, now Pat. No. 11,410,192.

(51) Int. Cl.
| | |
|---|---|
| *G06Q 30/02* | (2023.01) |
| *G06Q 30/0208* | (2023.01) |
| *G06Q 30/0283* | (2023.01) |
| *G06Q 30/0601* | (2023.01) |
| *G10L 15/30* | (2013.01) |

(52) U.S. Cl.
CPC ..... *G06Q 30/0208* (2013.01); *G06Q 30/0283* (2013.01); *G06Q 30/0641* (2013.01); *G10L 15/30* (2013.01)

(58) Field of Classification Search
CPC ........... G06Q 30/0208; G06Q 30/0641; G06Q 30/0283; G10L 15/30
See application file for complete search history.

(56) References Cited

U.S. PATENT DOCUMENTS

| | | | |
|---|---|---|---|
| 2014/0164532 A1* | 6/2014 | Lynch ................. | H04L 12/1818 709/206 |
| 2016/0155443 A1 | 6/2016 | Khan et al. | |
| 2016/0217785 A1 | 7/2016 | Kennewick et al. | |
| 2017/0357534 A1* | 12/2017 | Gupta ................... | G06F 9/5027 |
| 2018/0039618 A1* | 2/2018 | Kumar ................... | G06F 40/30 |
| 2018/0083894 A1 | 3/2018 | Fung et al. | |
| 2018/0286391 A1* | 10/2018 | Carey ..................... | G10L 15/22 |
| 2018/0300161 A1* | 10/2018 | Landowski ........... | H04L 51/046 |
| 2019/0189117 A1 | 6/2019 | Kumar | |
| 2019/0205386 A1 | 7/2019 | Kumar et al. | |
| 2019/0213513 A1* | 7/2019 | Seacat DeLuca ...... | G06Q 50/30 |
| 2020/0135200 A1* | 4/2020 | Taparia ................... | G10L 15/30 |
| 2020/0184156 A1 | 6/2020 | Badr et al. | |

(Continued)

OTHER PUBLICATIONS

"Fandango lets moviegoers order tickets on Google Assistant" (Williams, Robert; published on May 7, 2018 at https://www.marketingdive.com/news/fandango-lets-moviegoers-order-tickets-on-google-assistant/522919/) (Year: 2018).*

(Continued)

*Primary Examiner* — James M Detweiler
(74) *Attorney, Agent, or Firm* — Gray Ice Higdon

(57) ABSTRACT

Group actions may be performed on behalf of multiple users based in part on the suitability of the various user devices of the different users to perform such group actions. Different user devices may also be used to generate different query intent determinations for a query such that the query intent determination made by a particular user device may be used to fulfill the query.

20 Claims, 7 Drawing Sheets

(56) References Cited

U.S. PATENT DOCUMENTS

2021/0103452 A1\* 4/2021 Pratt ................. G06Q 30/0283
2022/0067767 A1 3/2022 Carbune et al.

OTHER PUBLICATIONS

European Patent Office; International Search Report and Written Opinion of App. No. PCT/US2020/064943; 16 pages; dated Jul. 8, 2021.
European Patent Office; Invitation to Pay Additional Fees, Ser. No. PCT/US2020/064943; 10 pages; dated May 17, 2021.
Williams, Robert; Fandango lets moviegoers order tickets on Google Assistant; https://www.marketingdive.com/news/fandango-lets-moviegoers-order-tickets-on-google-assistant/522919/; dated May 7, 2018.
European Patent Office; Examination Report issued for Application No. 20839474.2, 21 pages, dated Jun. 23, 2023.
India Intellectual Property; Examination Report issued in Application No. 202227057521; 8 pages; dated Oct. 11, 2023.

\* cited by examiner

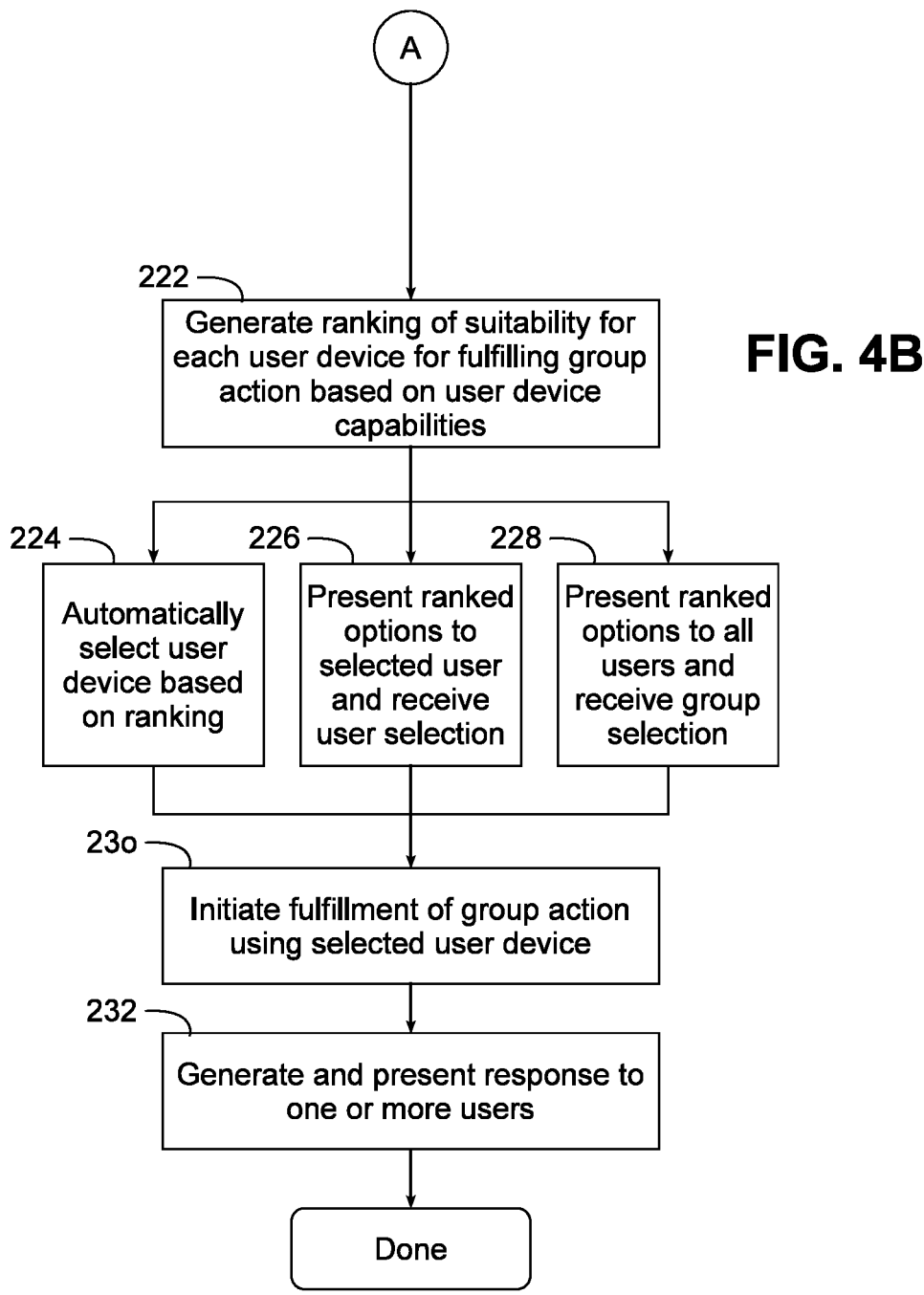

GROUP ACTION FULFILLMENT ACROSS MULTIPLE USER DEVICES

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input. An automated assistant generally responds to a command or request by providing responsive user interface output, which may include audible and/or visual user interface output.

Automated assistants enable users to obtain information, access services, and/or perform various tasks. For example, users are able to execute searches, get directions, and in some cases, interact with third party computing services. Users may also be able to perform a variety of actions, such as calling cars from ride-sharing applications, ordering goods or services (e.g., pizza), controlling smart devices (e.g., light switches), making reservations, and so forth.

Automated assistants may converse with users using voice recognition and natural language processing, with some also utilizing machine learning and other artificial intelligence technologies, for instance, to predict user intents. Automated assistants may be adept at holding conversations with users in natural, intuitive ways, in part because they understand dialog context. To utilize dialog context, an automated assistant may preserve recent inputs from the user, questions that came from the user, and/or responses/questions provided by the automated assistant. For example, the user might ask, "Where is the closest coffee shop?", to which the automated assistant might reply, "Two blocks east." The user might then ask, "How late is it open?" By preserving at least some form of dialog context, the automated assistant is able to determine that the pronoun "it" refers to "coffee shop" (i.e., co-reference resolution).

Automated assistants may also be used to perform tasks for groups of individuals located in the same physical or virtual space. For example, automated assistants may be used to book a restaurant or a ride with a ride-sharing service when a group of individuals is physically together or is planning to do something together in the near future. Conventionally, however, the use of an automated assistant to perform such a group action is still generally accomplished by a single automated assistant, as one of the participants generally volunteers to interact with his or her automated assistant in order to complete the action.

SUMMARY

Techniques are described herein for facilitating the performance of group actions on behalf of multiple users where the suitability of the various user devices of the different users to perform a group action may be determined and used to select a particular user device with which to fulfill the group action. In some implementations, different user devices may also be used to generate different query intent determinations for a query such that the query intent determination made by a particular user device may be used to fulfill the query.

Therefore, consistent with one aspect of the invention, a method of fulfilling a group action for a plurality of users having respective user devices may include identifying, from among the user devices of the plurality of users, a set of user devices that are capable of fulfilling the group action, generating a ranking of the set of user devices based at least in part on suitability of each user device in the set of user devices to fulfill the group action, selecting a user device among the set of user devices to fulfill the group action based at least in part on the generated ranking, and initiating fulfillment of the group action on the selected user device.

In some embodiments, identifying the set of user devices includes determining that the set of user devices are in physical proximity to one another. Also, in some embodiments, determining that the set of user devices are in physical proximity to one another includes detecting physical proximity between first and second user devices among the set of user devices based on location data, based on communication over a local network, or based on audio-based communication. Further, in some embodiments, identifying the set of user devices includes determining that the set of user devices are electronically interacting with one another. In some embodiments, determining that the set of user devices are electronically interacting with one another includes determining that the users of the set of user devices are participating in an interactive messaging session with one another using the set of user devices. In addition, in some embodiments, identifying the set of user devices includes accessing a contact list of one or more of the plurality of users.

Some embodiments may also include forming an assistant cluster between assistant instances resident on each of the set of user devices, and exchanging user device capabilities for the set of users devices within the assistant cluster, where identifying the set of user devices and generating the ranking are performed by the assistant cluster based at least in part of the exchanged user device capabilities. In addition, some embodiments may also include receiving permission from one or more of the plurality of users prior to joining the user device(s) of the one or more of the plurality of users to the assistant cluster.

In addition, some embodiments may further include detecting a query for the group action with the assistant cluster, and determining the query for the group action includes distributing context data associated with the query to multiple user devices in the set of user devices, receiving from each of the multiple user devices a query intent determination generated by such user device, and selecting a query intent determination from among the received query intent determinations. In some embodiments, selecting the query intent determination is performed in response to user input selecting one of the received query intent determinations.

Moreover, in some embodiments, the group action is performed at least in part using a particular application resident on at least one user device among the set of user devices. In some embodiments, generating the ranking of the set of user devices is based at least in part on whether the particular application is installed on one or more of the user devices in the set of user devices. In addition, in some embodiments, generating the ranking of the set of user devices is based at least in part on a version of the particular application that is installed on one or more of the user devices in the set of user devices. In some embodiments, generating the ranking of the set of user devices is based at least in part on whether the particular application is executable on one or more of the user devices in the set of user devices.

In addition, in some embodiments, the group action is performed at least in part using a particular account-accessible service resident on at least one user device among the set of user devices. Also, in some embodiments, generating the ranking of the set of user devices is based at least in part on whether the user of one of the user devices in the set of user devices has an account with the account-accessible service. In some embodiments, generating the ranking of the set of user devices is based at least in part on whether the user of one of the user devices in the set of user devices participates in a loyalty program for the account-accessible service.

In addition, in some embodiments, generating the ranking of the set of user devices is based at least in part on a capability of an assistant instance resident on one of the user devices in the set of user devices. Also, in some embodiments, the group action is performed at least in part using a particular language, and generating the ranking of the set of user devices is based at least in part on a language configuration of one of the user devices in the set of user devices.

Moreover, in some embodiments, generating the ranking of the set of user devices is based at least in part on a charge associated with fulfilling the group action by one of the user devices in the set of user devices. Further, in some embodiments, generating the ranking of the set of user devices is based at least in part on a discount, reward, or credit that may be used as payment for fulfilling the group action by one of the user devices in the set of user devices. Also, in some embodiments, generating the ranking of the set of user devices is based at least in part on a loyalty award that may be awarded for fulfilling the group action by one of the user devices in the set of user devices.

Some embodiments may also include executing an application on one of the user devices to determine a cost for and/or ability of the application to fulfill the group action using the one of the user devices, and generating the ranking of the set of user devices is based at least in part on the determined cost for and/or ability of the application to fulfill the group action. Some embodiments may further include accessing an online service from one of the user devices to determine a cost for and/or ability of the online service to fulfill the group action using the one of the user devices, and generating the ranking of the set of user devices is based at least in part on the cost for and/or ability of the online service to fulfill the group action.

Further, in some embodiments, selecting the user device to fulfill the group action is performed automatically based at least in part on the generated ranking. In some embodiments, selecting the user device to fulfill the group action is performed in response to selection by one of the plurality of users. Also, in some embodiments, selecting the user device to fulfill the group action is performed in response to voting by multiple users among the plurality of users. Some embodiments may also include generating a suggestion to fulfill the group action based upon interaction between at least a subset of the plurality of users, and identifying the set of user devices and generating the ranking are performed in response to generating the suggestion.

Consistent with another aspect of the invention, a method of resolving an intent of a query issued among a plurality of users having respective user devices may include identifying, from among the user devices of the plurality of users, a set of user devices that are capable of resolving the intent of the query, receiving from each user device among the set of user devices a query intent determination generated by such user device, selecting a query intent determination from among the received query intent determinations, and initiating fulfillment of the query based at least in part upon the selected query intent determination.

Some embodiments may further include generating a ranking of the received query intent determinations, and selecting the query intent determination is performed automatically based at least in part on the generated ranking. In some embodiments, selecting the query intent determination is performed in response to selection by one of the plurality of users. Further, in some embodiments, selecting the query intent determination is performed in response to voting by multiple users among the plurality of users.

Also, in some embodiments, the query is associated with a group action for the plurality of users, the method further including identifying, from among the user devices of the plurality of users, a second set of user devices that are capable of fulfilling the group action, generating a ranking of the second set of user devices based at least in part on suitability of each user device in the second set of user devices to fulfill the group action, and selecting a second user device among the second set of user devices to fulfill the group action based at least in part on the generated ranking, where initiating fulfillment of the query includes initiating fulfillment of the group action on the selected second user device.

Consistent with another aspect of the invention, a method of fulfilling a group action for a plurality of users having respective user devices may include receiving, from first and second user devices respectively associated with first and second users among the plurality of users, first and second query intent determinations generated in response to context data associated with a query for the group action, selecting the first query intent determination received from the first user device to resolve the intent of the query, and selecting the second user device to fulfill the group action based at least in part on the first query intent determination.

In addition, some implementations may include a system including one or more user devices, each with one or more processors and memory operably coupled with the one or more processors, where the memory(ies) of the one or more user devices store instructions that, in response to execution of the instructions by the one or more processors of the one or more user devices, cause the one or more processors to perform any of the aforementioned methods. Some implementations also include at least one non-transitory computer-readable medium including instructions that, in response to execution of the instructions by one or more processors, cause the one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIGS. 4A and 4B are flowcharts illustrating another example sequence of operations for fulfilling a group action, in accordance with various implementations.

DETAILED DESCRIPTION

Figure 1:
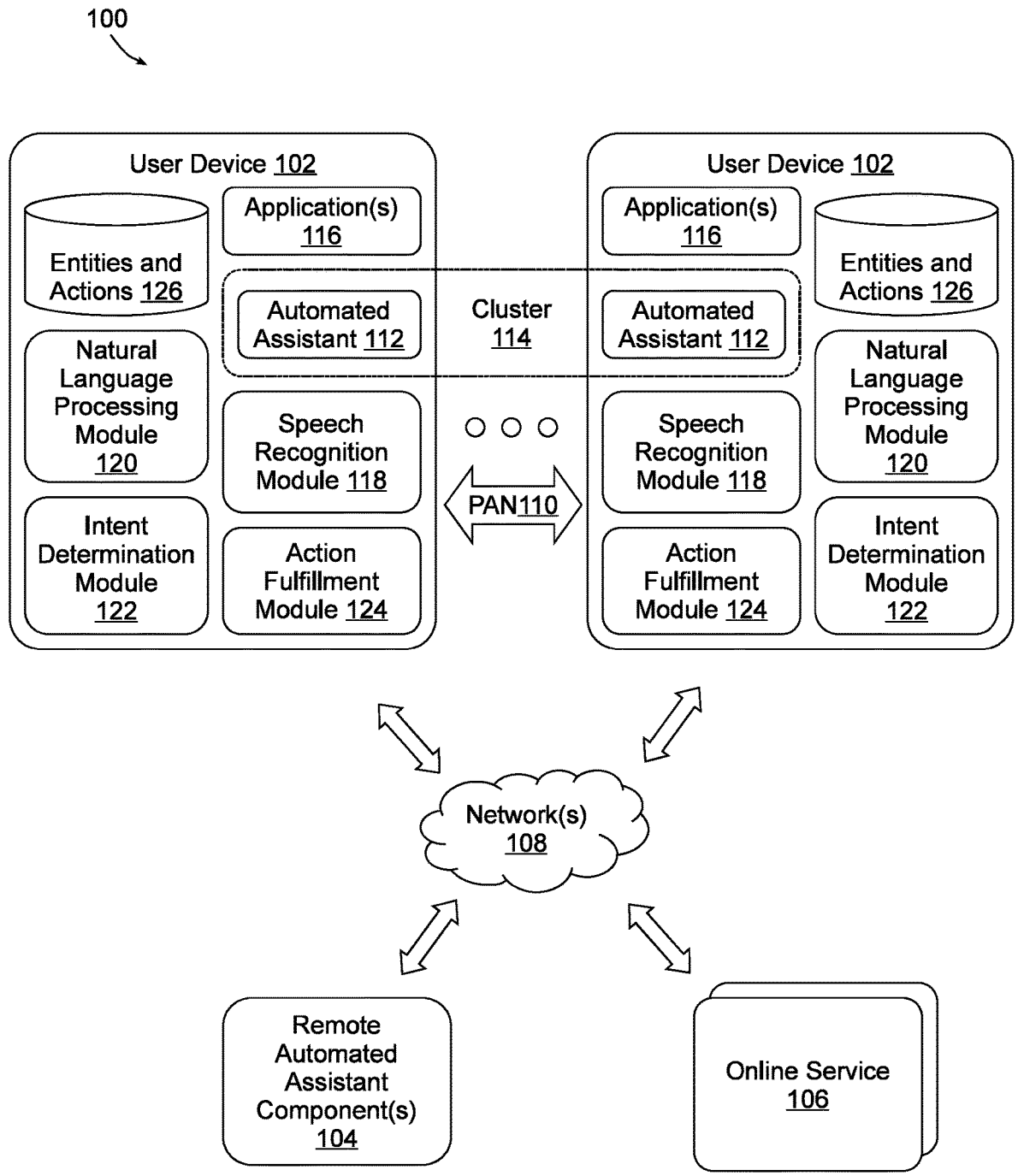
FIG. 1 is a block diagram of an example computing environment in which implementations disclosed herein may be implemented.

Now turning to FIG. 1, an example environment 100 in which techniques disclosed herein may be implemented is illustrated. The example environment 100 includes a plurality of user devices 102 interfaced with one or more remote and/or cloud-based automated assistant components 104 and/or one or more online services 106, which may be implemented on one or more computing systems that are communicatively coupled to user devices 102 via one or more local and/or wide area networks (e.g., the Internet) indicated generally at 108. In addition, it will be appreciated that in some instances, user devices 102 may communicate with one another via a personal area network (PAN) 110 or other proximity-based communications when user devices 102 are disposed in the same general geographical location, e.g., using Bluetooth, Wi-Fi, NFC, or another short-range technology.

Each user device 102, computing device(s) operating remote or cloud-based automated assistant components 104, and computing device(s) operating online services 106 may include one or more memories for storage of data and software applications, one or more processors for accessing data and executing applications, and other components that facilitate communication over a network. The operations performed by a user device 102, by automated assistant component(s) 104 and/or by online services 106 may be distributed across multiple computer systems, e.g., as computer programs running on one or more computers in one or more locations that are coupled to each other through a network. In various implementations, for example, some or all of the functionality of an automated assistant may be distributed between multiple computer systems, or even to a client computing device. In some implementations, for example, the assistant functionality discussed herein may be performed entirely within a client computing device (or multiple client computing devices), e.g., so that such functionality is available to a user even when no online connectivity exists. As such, in some implementations, a user device may include a client device, while in other implementations a user device may include one or more computer systems remote from a client device, or even a combination of a client device and one or more remote computer systems, whereby a user device is a distributed combination of devices. A user device may therefore in various implementations be considered to include any electronic device that implements any of the functionality of an automated assistant.

User device 102 in the illustrated implementation is generally a computing device upon which an instance of an automated assistant client 112, by way of its interactions with one or more remote and/or cloud-based automated assistant components 104, may form what appears to be, from the user's perspective, a logical instance of an automated assistant with which the user may engage in a human-to-computer dialog. For the sake of brevity and simplicity, the term "automated assistant" as used herein as "serving" a particular user will refer to the combination of an automated assistant client 108 executing on a user device 102 operated by the user and one or more remote and/or cloud-based automated assistant components 104 (which may be shared amongst multiple automated assistant clients in some implementations), although it will be appreciated that, as noted above, an automated assistant for a particular user may be entirely resident on a user device or in a cloud-based service.

In the illustrated implementation, fulfillment of group actions may be coordinated by the automated assistants of multiple users, and as such, in some implementations, multiple automated assistants may form an automated assistant cluster 114 to facilitate interaction between different automated assistant instances. It will be appreciated that in some implementations, all of the assistant instances 112 may be from the same assistant provider or vendor, and may be the same versions, or in some instances, may be different versions (e.g., in the case one user's device is running a different version of the operating system software from another user's device). In other implementations, the assistant instances 112 may be from different assistant providers or vendors, e.g., with support for inter-assistant communications or a common API.

User device 102 may also include instances of various applications 116, which in some implementations may interact with or otherwise be supported by an automated assistant. Among the various applications 116 that may be supported include, for example, messaging applications, video applications, conferencing applications, mail applications, taxi and ride sharing applications, travel-related applications, restaurant-related applications, entertainment-related applications, or any other applications with which group actions may be fulfilled and/or in which group communications may be undertaken. In addition, from a hardware perspective, user device 102 may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television, and/or a wearable apparatus of the user that includes a computing device (e.g., a watch of the user having a computing device, glasses of the user having a computing device, a virtual or augmented reality computing device). Additional and/or alternative computing devices may be used in other implementations, and it will be appreciated that a user device in various implementations may utilize assistant functionality as its sole function, while in other implementations the assistant functionality may be a feature of a computing device that performs a vast array of other functions.

As described in more detail herein, an automated assistant engages in human-to-computer dialog sessions with one or more users via user interface input and output devices of user device 102. Moreover, various additional components are resident in user device 102 in connection with supporting such sessions, and in particular, to support fulfillment of group actions with the user device.

For example, a speech recognition module 118 may be used to generate or transcribe text (and/or other suitable representations or embeddings) from spoken audio input from a user, while a natural language processing module 120 may be used to generate one or more entities. In some implementations, speech recognition module 118 is also a streaming module, such that voice input is converted to text on a token-by-token basis and in real time or near-real time, such that tokens may be output from module 118 effectively concurrently with a user's speech, and thus prior to a user enunciating a complete spoken request. Speech recognition module 118 may rely on one or more acoustic and/or language models, which together model a relationship between an audio signal and phonetic units in a language, along with word sequences in the language. In some implementations, a single model may be used, while in other implementations, multiple models may be supported, e.g., to support multiple languages, multiple speakers, etc.

Whereas speech recognition module 118 converts speech to text, natural language processing module 120 attempts to discern the semantics or meaning of the text output by module. For example, natural language processing module 120 may rely on one or more grammar models to map action text to particular computer-based actions and to identify entity text and/or other text that constrains the performance of such actions. In some implementations, a single model may be used, while in other implementations, multiple models may be supported, e.g., to support different computer-based actions or computer-based action domains (i.e., collections of related actions such as communication-related actions, search-related actions, audio/visual-related actions, calendar-related actions, device control-related actions, etc.). As an example, a grammar model (stored on user device 102 and/or remote computing device(s)) may map computer-based actions to action terms of voice-based action queries such as the action terms "tell me more about", "directions to", "navigate to", "watch", "call", "email", "contact", etc.

Moreover, each user device 102 may also include an intent determination module 122 and an action fulfillment module 124. Intent determination module 122, for example, may take the output of natural language processing module 120 to determine the intent of a spoken input of a user. Further, in some implementations, intent determination module 122 may process other forms of input, e.g., text input entered by various users into a messaging application, in order to determine the intent of a particular input. Intent determination module 122 may be responsive to direct inputs by one or more users in some implementations, while in other implementations, intent determination module 122 may monitor user interactions, e.g., within a messaging application, and generate suggestions for potential queries that may be of interest to the users. Thus, for example, in some implementations, modules 120 and 122 may together be used to determine the intent of an input that is explicitly directed at an automated assistant (e.g., to generate a ride request based on an explicit request such as "OK assistant, please book us a ride to the club"), while in some implementations, modules 120 and 122 may be used to monitor for potential queries or group actions based upon user interaction (e.g., to generate a ride request based on a transcript such as "Tim: I'm tired, I'm ready to go home", "Ted: I agree, let's round everyone up and get out of here").

Action fulfillment module 124 may be used to act upon the determined intent, e.g., to initiate and/or coordinate performance of various actions, including group actions. Module 124, for example, may issue calls to various applications, online services, or assistant-related functionality to cause requested actions to be performed.

To support one or more of modules 118-124, an entities and actions storage 126 may store the entities identified in any user input as well as any actions (e.g., suggestions, responses, etc.) that may be triggered in response to user input associated with any stored entities. While the invention is not so limited, in some implementations an action is analogous to a verb and an entity is analogous to a noun or pronoun, such that a query may identify or otherwise be associated with an action to perform and one or more entities that are the focus of the action. Thus, when executed, a user query may cause performance of a computer-based action in view of one or more entities referred to (either directly or indirectly via surrounding context) in the query.

It will be appreciated that some or all of the functionality of any of the aforementioned modules and components illustrated as being resident in user device 102 may be implemented in a remote automated assistant component in other implementations. Specifically, any of the operations discussed hereinafter as being performed by a user device may, in some implementations, be performed entirely on in part by a remote service. Therefore, the invention is not limited to the specific allocation of functionality shown in FIG. 1.

Figure 2:
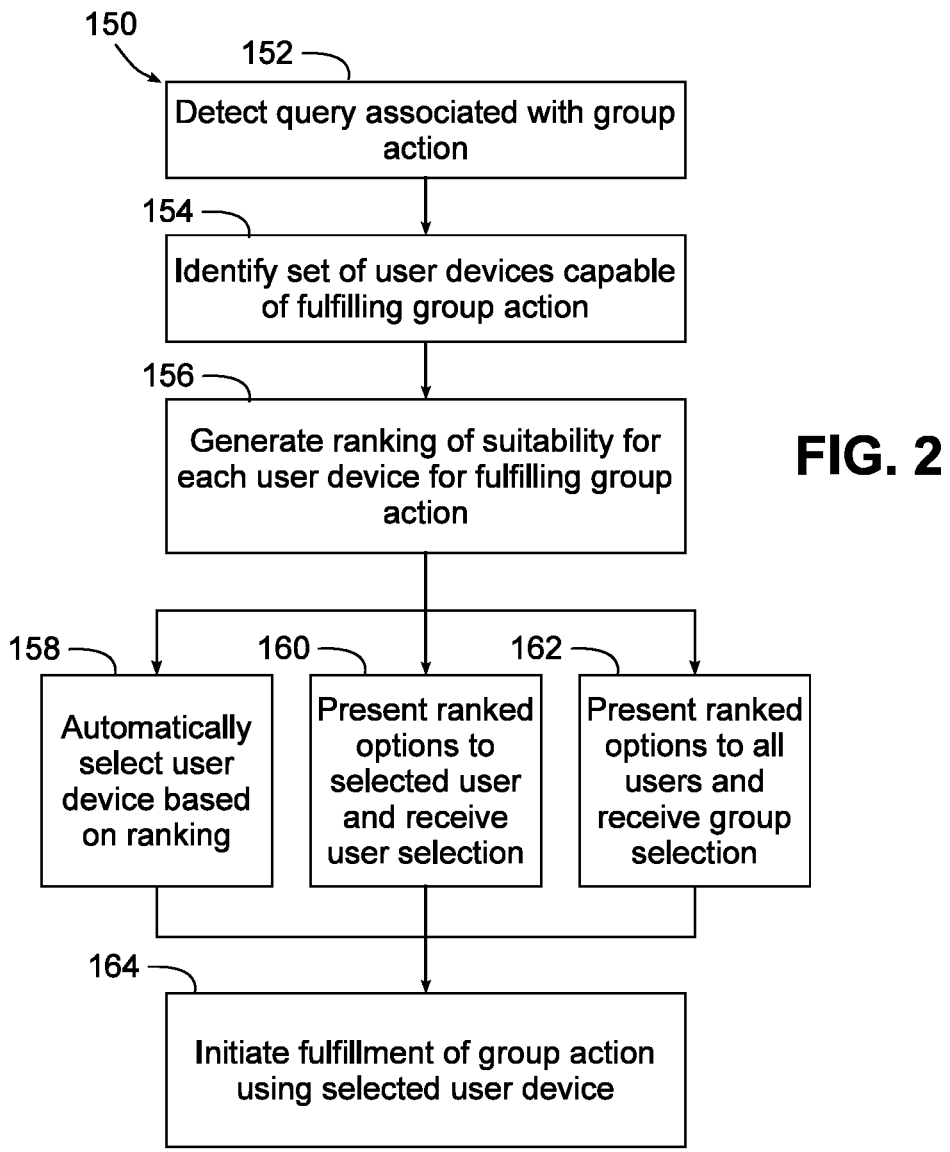
FIG. 2 is a flowchart illustrating an example sequence of operations for fulfilling a group action, in accordance with various implementations.
Figure 3:
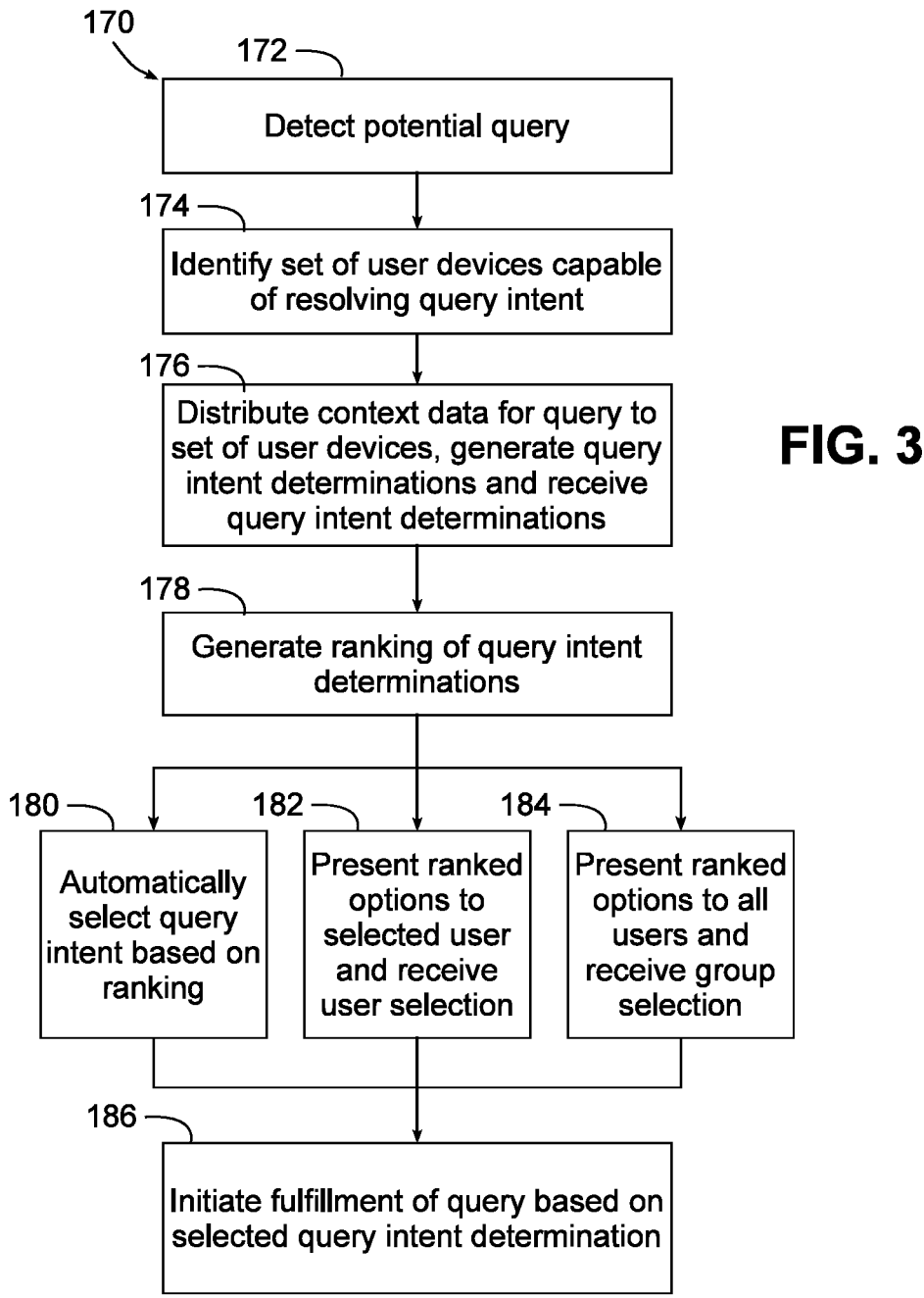
FIG. 3 is a flowchart illustrating an example sequence of operations for determining a query intent, in accordance with various implementations.

Now turning to FIGS. 2-4, as noted above, in some embodiments, group actions may be fulfilled on behalf of a group of users. For example, a group of friends may be looking at booking a restaurant, a hotel, or a taxi to a particular destination. In such circumstances, there can be different device and/or application capabilities available across the set of users. Ideally, the user with the most suitable device and/or application should be the one performing the action on behalf of the whole group.

In some implementations, for example, it may be desirable to support action fulfillment across devices and users, such that multiple assistant-enabled devices interacting virtually via messaging or chat or while in the same physical location, can effectively jointly utilize their understanding, fulfillment and/or execution stacks to best fulfill user intents.

An example use-case is "order a ride to the park for us" in a chat group with multiple assistant-enabled devices that each has a different ride sharing application and/or where different users may have different rates, loyalty rewards, promo codes, credits, etc. that may be usable with different ride sharing applications. In some implementations, the query may initiate a negotiation between multiple user devices to fulfill the query in the most convenient way in terms of cost and current availability. Thus, for example, if one user has a free credit or will be granted an award with one more booking, or if one user's ride sharing application returns a lower cost and/or an earlier pickup time than the applications for the other users, that user's device may be selected as the most optimal device with which to fulfill the requested group action.

Now turning to FIG. 2, this figure illustrates an example sequence of operations 150 for fulfilling a group action consistent with some implementations, performed on behalf of a plurality of users having respective user devices. In block 152, a query associated with a group action may be detected, e.g., as a result of receiving an explicit query from a user through an assistant interface, or as a result of analysis of a transcript or other context data associated with an interaction between the various users. Next, in block 154, a set of user devices capable of fulfilling the group action are identified from among the user devices of the various users. In some implementations, this set may be limited to user devices that have been detected as having a capability of handling a specific group action, while in other implementations, this set may include all of the user devices for all of the users in the group, such that, if for a particular group action, a particular user device is determined to lack an ability to handle the particular group action, that device will simply be ranked lower than other devices capable of handling the group action or filtered out altogether.

In addition, whether or not a device is included in the set may also be based on user permissions. Thus, if a particular user has not opted in to group actions (either as a general opt-in, or specific to the current group or query), that user may be prompted to enable such functionality or that user's device may be excluded from the set. In addition, in some implementations, whether or not a device is included in the set may be based on whether the device is participating in a group activity, e.g., based on participation in an interactive messaging session such as a group chat or other virtual interaction, or based on proximity in a physical space, and detected based on location or interconnection over a local network such as NFC, Bluetooth or a Wi-Fi hotspot. In some implementations, audio-based communications such as audio fingerprinting or ultrasound-based communications may also be used to detect when different user devices are in the same physical location. It will be appreciated that in some implementations, user permission to join a group may be sought from the user and/or from other members of the group prior to including the user's device in the set, e.g., to limit group participation when users are in a crowded location with others who would not be welcome in the group.

Next, in block 156, a ranking of the set of user devices is generated based at least in part on suitability of each user device in the set of user devices to fulfill the group action. Suitability, in this regard, may refer at least in part to whether or not a user device is capable of fulfilling a group action and/or how well the user device is capable of fulfilling the request. Thus, the ranking of different user devices based on suitability may be based on a number of factors depending upon the type of group action.

In some implementations, for example, a group action may be performed using a particular application or type of application (e.g., various applications associated with different ride sharing services, travel-related services, restaurant-related services, ticketing-related services, entertainment-related services, etc.) that is resident on one or more of the user devices, such that the suitability of a particular user device is based at least in part on whether the particular application or application type is installed on that user device, what version of a particular application is installed on that user device, or even whether a particular application is executable on the user device and/or whether or not a user has created an account in an application yet. It will be appreciated, for example, that in some instances a user device may not be capable of running applications, or a particular provider's application may not be offered for a particular type of user device. Similarly, if the group action is associated with an online and/or account-accessible service, the suitability of a particular user device to fulfill such a group action may be based at least in part on various factors such as whether a particular user has an account with the particular account-accessible service, and/or whether the user participates in a loyalty program for the account-accessible service.

The suitability of a user device may also be based at least in part on a charge associated with fulfilling the group action by the user device, on any discount, reward, or credit that may be used as payment for fulfilling the group action on that user device, or any loyalty award that may be awarded for fulfilling the group action with that user device. In some implementations, the determination of the suitability in such instances may incorporate executing an application and/or access an online service to determine a cost for and/or ability of the application or online service to fulfill the group action. The suitability may also, in some instances, be based at least in part on how quickly and/or well the user device can fulfill the group action (e.g., to prefer ride shares with a shorter wait time, or to prefer ride shares with larger vehicles when the group size is more than two or three people).

It will be appreciated that in some instances, the cost for a group action may be incurred entirely by the user of the device that fulfills the group action. In other instances, however, functionality may be supported to split the cost between the members of the group, e.g., using cost splitting functionality supported by some ride sharing and other applications and online services, such that the financial impact of the users in the group is based principally on which user's device can fulfill the group action for the lowest cost.

Thus, in one non-limiting example, three different users may use three different ride sharing services, and when a group action to order a ride for the three users is contemplated, the associated application on each user's device may be queried for a cost and/or any discounts or rewards that may affect the suitability of the user's preferred ride sharing service for handling the group action. One user's application may return that no cars are available at the moment, while another user's application may return that a car is available in 7 minutes for a cost of $10.14, and another user's application may return that a car is available in 3 minutes, but that, even with a $4.00 reward applied, the cost will be $11.45.

In some implementations, the ranking of a user device may be based at least in part on a capability of an assistant instance resident on that user device, e.g., whether different user devices are running different versions of assistant instances or assistant instances of different providers. Further, in some implementations, a user or user device's native and/or configured language may be used to determine suitability. Thus, if one user is German and another user is English, but a ride sharing service is being requested in Germany, the user device of the German user may be ranked higher to facilitate user communication with the driver.

Other factors may also be considered when determining suitability of different user devices and ranking the user devices. It will be appreciated further that various ranking algorithms may be used to consider a multitude of factors, e.g., by scoring or weighting different factors based on relevance to the group action in question.

Next, a user device to fulfill the group action is selected, based at least in part on the generated ranking. As illustrated by blocks 158-162, such a selection may be performed differently in different implementations.

For example, in some implementations, and as illustrated in block 158, selection may be automatic based on the ranking, e.g., to select the highest ranked user device, whereby no user input is solicited. Alternatively, as illustrated in block 160, the ranked options may be presented to a single user such that the single user selects the user device upon which to fulfill the group action. In some implementations, the single user may be a "primary" user, e.g., the user that issued the request for the group action, or a user designated as the leader of the group. In other implementations, the single user may be the user of the user device with the highest ranking, whereby the selection is effectively a consent by the user to fulfill the group action on that user's device.

As another alternative, and as illustrated in block 162, multiple users may be presented with the ranking and allowed to select the user device with which to fulfill the group action. In some instances, a majority voting protocol may be used for the selection, while in other instances unanimous consent or other rules may be required. In such instances, consent by the user of the selected user device may still be sought prior to fulfilling the group action.

Regardless of how the user device is selected, block 164 next initiates fulfillment of the group action on the selected user device. Fulfillment, in this regard, may include various operations suitable for the particular group action involved, e.g., issuing a request to an online service, issuing a request through an application, or in some instances, simply opening an application or accessing an online service on the selected user's device to enable them to manually complete the fulfillment.

Now turning to FIG. 3, the functionality described herein may also in some implementations be used to resolve the intent of a query issued among a plurality of users having respective user devices. Similar to fulfilling a group action, the differing capabilities of different user devices to resolve intent may be leveraged to optimize intent determinations for queries, even for actions that are not necessarily any of the various group-related actions discussed above. FIG. 3 in particular illustrates a sequence of operations 170 that begins in block 172 by detecting a potential query, e.g., as a result of a user issuing an explicit query or as a result of analysis of a transcript that identifies a suggestion for a particular query based on the transcript.

In block 174, a set of user devices that are capable of resolving the intent of the query is identified, e.g., based upon similar factors to those described above in connection with block 154 of FIG. 2. Next, in block 176, context data associated with the potential query may be distributed to each of the user devices in the set, causing each user device to generate a query intent determination and return that generated query intent determination to one or more other user devices in the set. The context data may include text associated with the query, transcript data, audio data, and in some instances may include other data associated with the participants in a conversation and/or prior queries made thereby, from which an understanding of the intent of the query may be better determined. A query intent determination in turn may be considered to be a determination of the meaning of the query, and what is being requested in the query. Such query intent determinations may be shared among all user devices in some implementations, while in other implementations the user devices may return their determinations to a single user device for further processing.

Next, in block 178, a ranking of the query intent determinations may optionally be made, e.g., based on confidence values associated with each determination. In other implementations, no ranking may be made, and each user device's determination may be considered. Further, in some implementations, user devices generating the same or similar intent determinations may be combined, such that selection is made only between different distinct intent determinations and/or such that selection may be based on a single intent determination if all user devices generate the same intent determination.

Next, one query intent determination is selected from among the received query intent determinations, e.g., in a similar manner to that discussed above in connection with selecting a user device to fulfill a group action using one of blocks 158, 160 and 162. Specifically, in some implementations, selection may be automatic based on ranking (block 180). In other implementations, selection may be made by one user based upon a presentation of ranked options (block 182). In still other implementations, selection may be made by multiple users, e.g., based on majority voting or unanimous consent (block 184).

Once a query intent determination has been made, fulfillment of the query may be initiated in block 186, e.g., by performing a group action using operations discussed above in connection with FIG. 2, or performing other actions as will be appreciated by those of ordinary skill having the benefit of the instant disclosure. Of note, it will be appreciated that in some implementations, the user device that generates the query intent determination that is used to fulfill a group action may be a different user device from that used to actually fulfill the group action. Further, the set of user devices from which a query intent determination for a group action is made may be different than the set of user devices that are considered for fulfilling the group action.

Figure 4A:
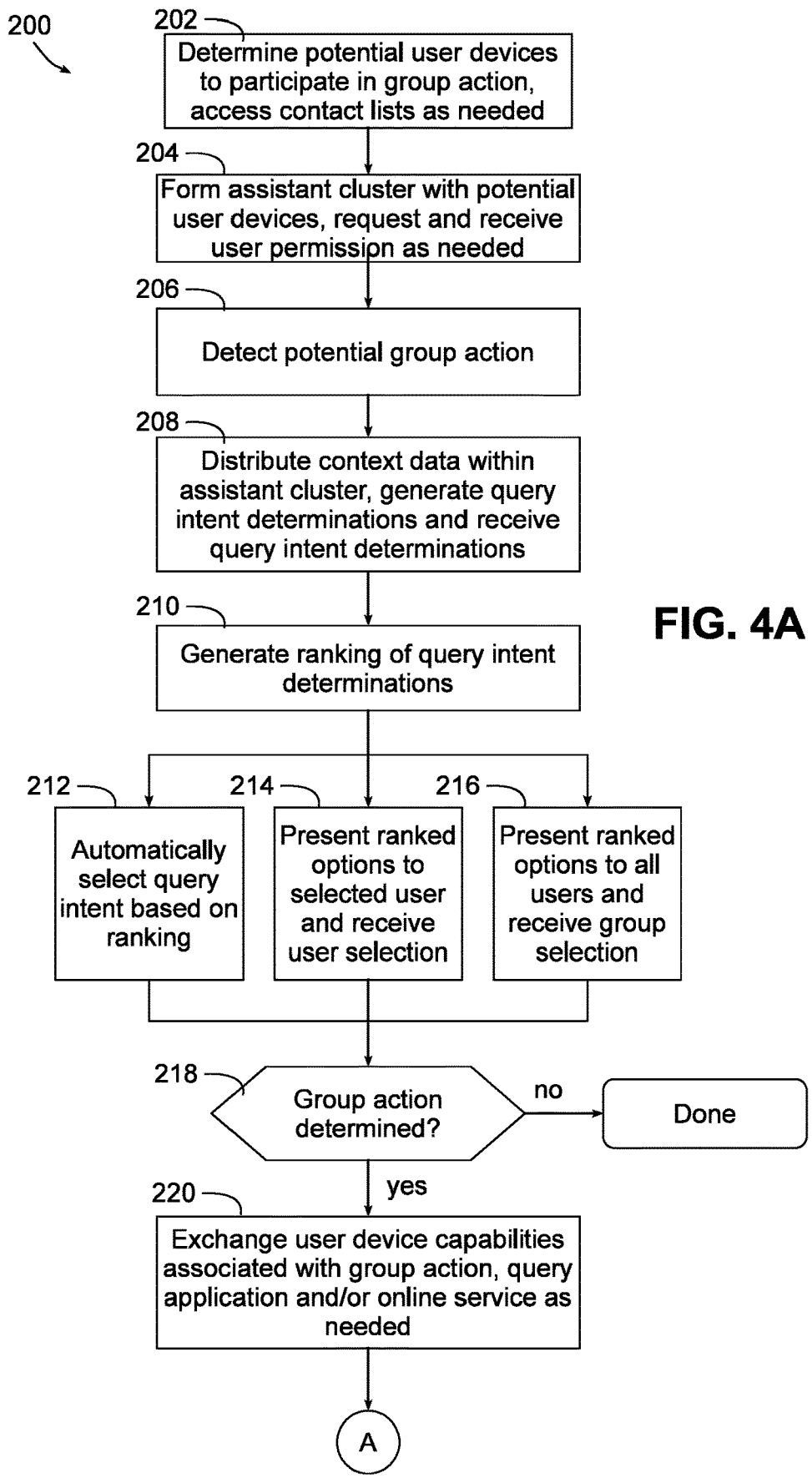

Now turning to FIGS. 4A-4B, in some implementations, group actions may be fulfilled across a group of multiple users that are all collaborating to get a task done, and utilizing a joint understanding and fulfillment stack, e.g., as may be implemented in an assistant cluster 114 of FIG. 1. In block 202, a number of potential user devices to participate in group actions may be determined. In one example implementation, users may have an ability to opt-in to expose their device capabilities in a privacy preserving manner to enable assistant instance-assistant instance interactions (e.g., via a predetermined protocol) without divulging to other users any device-specific details or other information. Such an implementation may also incorporate functionality to enable assistant instances to automatically detect devices and user accounts (which have opted-in), when different users are close to one another virtually or physically. For example, messaging or chat groups that are assistant-enabled by virtual of application integration may expose contact lists in some implementations to enable an assistant instance to determine which of the users in a group have opted-in and can support the joint understanding and fulfillment stack. As another example, for physically close devices, an assistant instance may use location-enabled services on user devices or use multi-device arbitration through a shared wireless connection or via audio-based communication such as audio fingerprinting to determine that users are in the same physical space without needing to share a virtual space.

Then, in block 204, a cluster of assistant-enabled devices that may collaborate to fulfill group actions may be formed. At this time, if any user permissions are needed, the individual users of the user devices participating in the cluster may be obtained, e.g., using a pop-up dialog or other suitable user interaction. Thus, in some implementations, user permission may be sought prior to any particular query or group action being detected. Further, in some implementations, once the assistant cluster is formed, the device capabilities exposed, e.g., through in-app integrations and/or online service integrations, or via other mechanisms available on each device and/or user account, may be listed jointly as being on a single device, with an additional device identifier field specifying which of the devices actually supports which capabilities. These can be application-specific functionality such as 'ride to, 'navigate to, 'listen to', 'book tickets to', 'book a room,' etc. It will also be appreciated that in other implementations, formation of an assistant cluster may not occur until after a potential group action has been detected.

Then, in block 206, the assistant cluster may leverage a joint understanding layer that triggers either on text commands via shared virtual space or voice commands via audio fingerprinting to detect a potential group action. Specifically, in block 206, a potential group action is detected, e.g., based on receipt of an explicit query, via analysis of a chat group conversation, etc. Then, in block 208, context data associated with the potential group action may be distributed within the assistant cluster, similar to block 176 of FIG. 3, to cause each user device in the cluster to generate a query intent determination and share that query intent determination within the cluster. It will generally be expected that the understanding layer may be similar among the user devices (e.g., particularly where each uses the same server-side functionality), but in case they are different (e.g., due to different on-device understanding due to different device models, device capabilities, or assistant versions or providers) then the interconnected assistant functionality in the cluster may generate different query intent determinations in an attempt to determine the most suitable intent determination among the different options.

Then, in block 210, a ranking is generated for the different query intent determinations, and one intent determination is selected, e.g., using one of the options illustrated in blocks 212, 214, 216, similar to the manner discussed above in connection with blocks 178-184 of FIG. 3. Next, in block 218, a determination is made as to whether the selected query intent is associated with a group action. If not, processing of the query may proceed in a conventional manner. If so, however, in block 220 user device capabilities associated with the specific group action are exchanged (e.g., forwarded to a primary device, or alternatively exchanged among all devices), such that a ranking of fulfillment options may be made. In some implementations, the exchange of user device capabilities may also include accessing an online service using each user's account and/or an application resident on each user's device to determine whether the group action can be fulfilled by that user's device and/or how suitable that user's device is for fulfilling the group action (e.g., based on cost, rewards, or any of the other metrics discussed above in connection with block 156 of FIG. 2).

Then, in block 222 the fulfillment layer ranks all the possible ways to fulfill given the different device capabilities and possibilities to execute and returns the ranking to the user devices, and then using any of the alternatives illustrated in blocks 224, 226 and 228, one of the user devices is selected to fulfill the group action, in a similar manner discussed above with respect to blocks 156-162 of FIG. 2. Once a user device is then selected to fulfill the group action, fulfillment is initiated by the assistant cluster using the selected user device in block 230, in a similar manner to block 164 of FIG. 2, thereby causing the group action to be performed. A suitable response to the initiated group action may then be generated and presented to one or more of the users in block 232, and fulfilment of the group action is then complete.

Figure 5A:
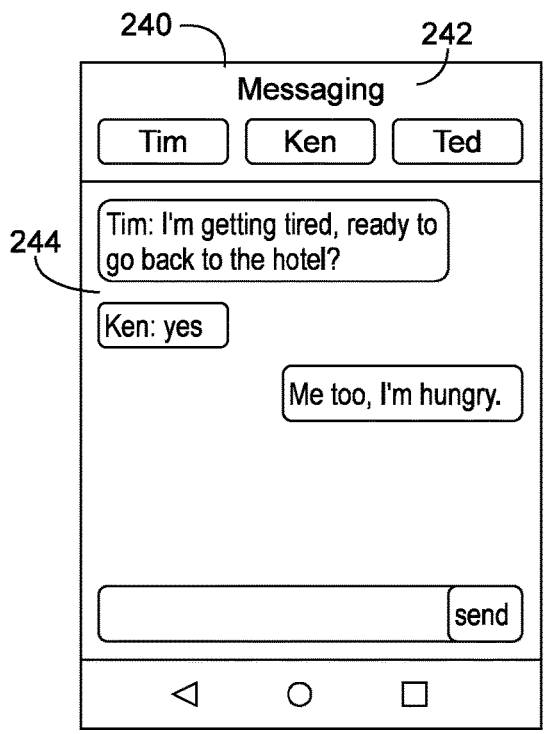
FIGS. 5A, 5B, 5C, and 5D illustrate an example graphical user interface for use in fulfilling a group action, in accordance with various implementations.
Figure 5B:
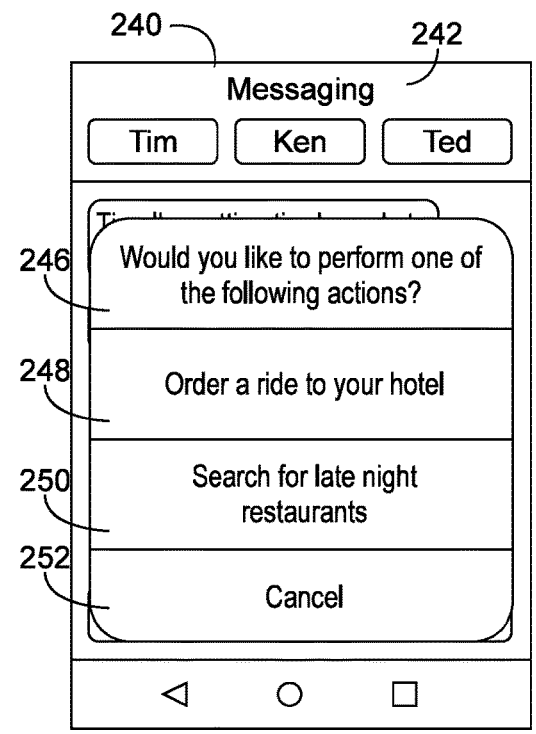

While the aforementioned functionality may be utilized to implement an innumerable number of different group actions in an innumerable number of different scenarios, FIGS. 5A-5D illustrate one example interaction associated with a group action being fulfilled, where each user participates in both the selection of query intent and the user device to fulfill a group action via a voting process. In this scenario, a user of a user device 240 is participating in a group chat via a messaging application 242 with three other users, Tim, Ken and Ted, who are both in the same physical location and participating in the group chat. A transcript of the group chat in FIG. 5A indicates that Tim and Ken are tired and ready to go back to their hotel, and that Ted is also hungry. Assuming that a potential group action is detected as a result of analysis of the transcription, different query intent determinations may be generated by the user devices of the different users. As shown in FIG. 5B, for example, assume that three of the user devices generated a query intent determination indicating that a suggestion should be displayed to order a ride to the users' hotel, while Ted's user device generated a query intent determination indicating that a suggestion should be displayed to search for late night restaurants. In one implementation, both query intent determinations may be presented to the group, enabling each user to select their preferred query intent determination, or to decline the suggestion altogether. Thus, each user may be presented with a pop up window 246 with three options, option 248 for ordering a ride, option 250 for searching for restaurants, and option 252 to cancel the potential group action.

Figure 5C:
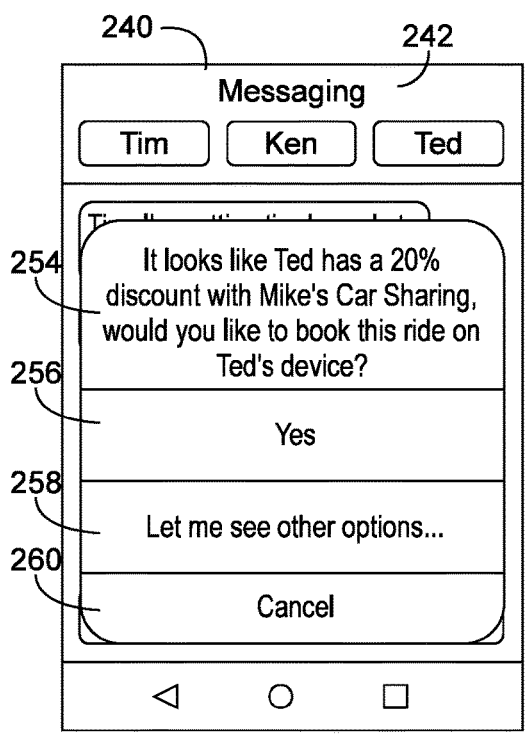
Figure 5D:
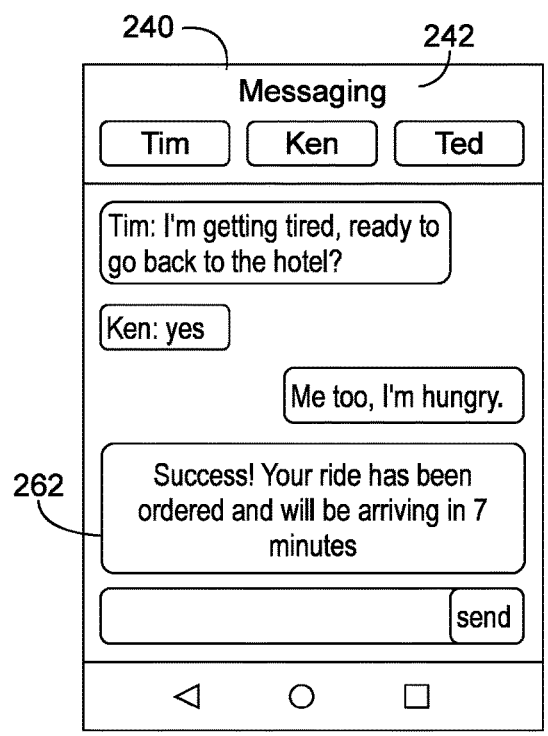

Assuming that the majority of the users select option 248, each user device may be queried to determine a suitability for that user device to perform the group action, and as illustrated in FIG. 5C, each user may be presented with various options for performing the group action. Specifically, in this implementation a pop up window 254 is generated with three options, a first option 256 showing the highest ranked user device (as it has been determined that Ted has a 20% discount with one of his available ride share services), a second option 258 allowing the user to view other, lower ranked options, and a third option 260 to cancel the group action. It will be appreciated that in other implementations, multiple user device options may be presented, rather than only the highest ranked option. Assuming that a majority of the users select the highest ranked option, the group action may be initiated on Ted's user device, and a confirmation response may be presented to each user as illustrated in 262 in FIG. 5D.

While the interaction illustrated in FIGS. 5A-5D is performed based upon a group chat scenario, as noted above, a group action may be initiated in other manners in other implementations. Thus, for example, in another example scenario, the four users mentioned above may be sitting together at the same location and may verbally decide to call for a ride. One of the users may explicitly invoke the assistant instance on his or her user device and ask for a ride to the hotel, and the aforementioned operations may be performed to rank the suitability of each user device to fulfill the request and enable one or more of the users to view the ranking and select one of the user devices to fulfill the request.

Figure 6:
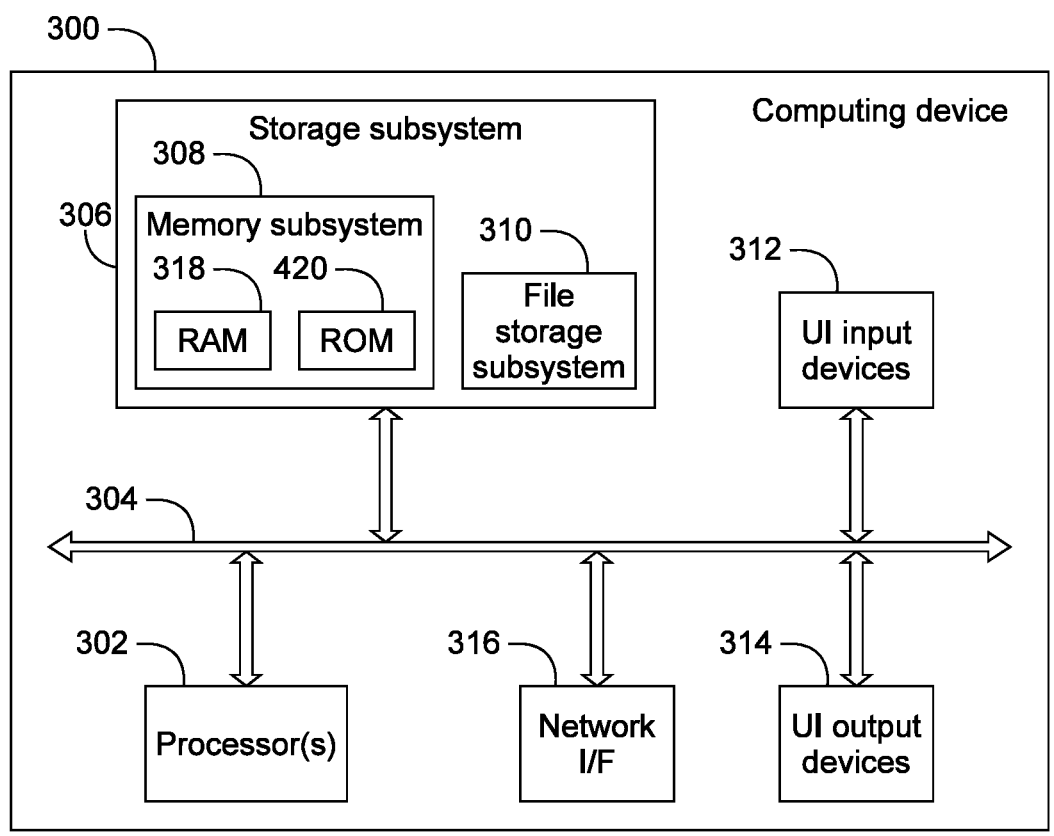
FIG. 6 illustrates an example architecture of a computing device.

FIG. 6 is a block diagram of an example computing device 300 suitable for implementing all or a part of the functionality described herein. Computing device 300 typically includes at least one processor 302 that communicates with a number of peripheral devices via bus subsystem 304. These peripheral devices may include a storage subsystem 306, including, for example, a memory subsystem 308 and a file storage subsystem 310, user interface input devices 312, user interface output devices 314, and a network interface subsystem 316. The input and output devices allow user interaction with computing device 300. Network interface subsystem 316 provides an interface to outside networks and is coupled to corresponding interface devices in other computing devices.

User interface input devices 312 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 300 or onto a communication network.

User interface output devices 314 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 300 to the user or to another machine or computing device.

Storage subsystem 306 stores programming and data constructs that provide the functionality of some or all of the modules described herein. For example, the storage subsystem 306 may include the logic to perform selected aspects of the various sequences illustrated in FIGS. 2, 3, and 4A-4B.

These software modules are generally executed by processor 302 alone or in combination with other processors. Memory 308 used in the storage subsystem 306 can include a number of memories including a main random access memory (RAM) 318 for storage of instructions and data during program execution and a read only memory (ROM) 320 in which fixed instructions are stored. A file storage subsystem 310 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 310 in the storage subsystem 306, or in other machines accessible by the processor(s) 302.

Bus subsystem 304 provides a mechanism for enabling the various components and subsystems of computing device 300 to communicate with each other as intended. Although bus subsystem 304 is shown schematically as a single bus, alternative implementations of the bus subsystem may use multiple busses.

Computing device 300 can be of varying types including a mobile device, a smartphone, a tablet, a laptop computer, a desktop computer, a wearable computer, a programmable electronic device, a set top box, a dedicated assistant device, a workstation, a server, a computing cluster, a blade server, a server farm, or any other data processing system or computing device. Due to the ever-changing nature of computers and networks, the description of computing device 300 depicted in FIG. 6 is intended only as a specific example for purposes of illustrating some implementations. Many other configurations of computing device 300 are possible having more or fewer components than computing device 300 depicted in FIG. 6.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method of fulfilling a group action to book a bookable service for a plurality of users having respective user devices, comprising:

detecting a query for the group action to book the bookable service using an assistant instance associated with at least one of the plurality of users, wherein the assistant instance is one of a plurality of assistant instances associated with the plurality of users and resident on respective user devices of the plurality of users;

determining an intent for the query detected using the assistant instance, wherein determining the intent for the query includes determining that the query is for a task to be performed on behalf of the plurality of users, and performance of the task fulfills the group action to book the bookable service;

forming an assistant cluster between the plurality of assistant instances;

exchanging user device capabilities for the respective user devices upon which the plurality of assistant instances of the assistant cluster are resident;

identifying, with the assistant cluster and from among the plurality of user devices, a set of user devices that are capable of fulfilling the group action to book the bookable service, wherein identifying the set of user devices is performed using the exchanged user device capabilities;

generating a ranking of the set of user devices based at least in part on suitability of each user device in the set of user devices to fulfill the group action to book the bookable service, wherein generating the ranking of the set of user devices includes:

accessing a first account-accessible service associated with a first user among the plurality of users and/or executing a first application resident on the respective user device among the set of user devices for the first user to retrieve a first wait time, a first charge, a first discount, a first reward, a first credit, or a first loyalty reward associated with fulfilling the group action to book the bookable service using the respective user device for the first user;

accessing a second account-accessible service associated with a second user among the plurality of users and/or executing a second application resident on a respective user device among the set of user devices for the second user to retrieve a second wait time, a second charge, a second discount, a second reward, a second credit, or a second loyalty reward associated with fulfilling the group action to book the bookable service using the respective user device for the second user; and generating the ranking using the retrieved first wait time, first charge, first discount, first reward, first credit, or first loyalty reward, and using the retrieved second wait time, second charge, second discount, second reward, second credit, or second loyalty reward;

selecting a particular user device among the set of user devices to fulfill the group action to book the bookable service based at least in part on the generated ranking; and initiating fulfillment of the group action to book the bookable service on the particular user device.

2. The method of claim 1, wherein the bookable service is a ride sharing service, a travel-related service, a restaurant-related service, a ticketing-related service, or an entertainment-related service.

3. The method of claim 1, wherein identifying the set of user devices includes determining that the set of user devices are in physical proximity to one another, and wherein determining that the set of user devices are in physical proximity to one another includes detecting physical proximity between a pair of user devices among the set of user devices based on location data, based on communication over a local network, or based on audio-based communication.

4. The method of claim 1, wherein identifying the set of user devices includes determining that the set of user devices are electronically interacting with one another, and wherein determining that the set of user devices are electronically interacting with one another includes determining that the users of the set of user devices are participating in an interactive messaging session with one another using the set of user devices.

5. The method of claim 1, wherein identifying the set of user devices and generating the ranking are performed by the assistant cluster based at least in part of the exchanged user device capabilities, and wherein the exchanged user device capabilities include one or more user device capabilities determined from accessing the account-accessible service associated with the first user and/or the application resident on the respective user device for the first user.

6. The method of claim 1, wherein the group action to book the bookable service is performed at least in part using a particular application resident on at least one user device among the set of user devices, and wherein at least one of identifying the set of user devices and generating the ranking of the set of user devices includes:

determining whether the particular application is installed on one or more of the user devices in the set of user devices;

determining a version of the particular application that is installed on one or more of the user devices in the set of user devices; or determining whether the particular application is executable on one or more of the user devices in the set of user devices.

7. The method of claim 1, wherein the group action to book the bookable service is performed at least in part using a particular account-accessible service resident on at least one user device among the set of user devices, and wherein at least one of identifying the set of user devices and generating the ranking of the set of user devices includes:

determining whether the user of one of the user devices in the set of user devices has an account with the particular account-accessible service; or determining whether the user of one of the user devices in the set of user devices participates in a loyalty program for the particular account-accessible service.

8. The method of claim 1, wherein the group action to book the bookable service is performed at least in part using a particular application type, and wherein at least one of identifying the set of user devices and generating the ranking of the set of user devices includes:

determining whether an application of the particular application type is installed on one or more of the user devices in the set of user devices; or determining whether an application of the particular application type is executable on one or more of the user devices in the set of user devices.

9. The method of claim 1, wherein generating the ranking of the set of user devices is based at least in part on the first charge and/or the second charge.

10. The method of claim 1, wherein generating the ranking of the set of user devices is based at least in part on the first discount, the first reward, the first credit, the second discount, the second reward, and/or the second credit.

11. The method of claim 1, wherein generating the ranking of the set of user devices is based at least in part on the first a loyalty award and/or the second loyalty award.

12. The method of claim 1, wherein accessing the account-accessible service associated with the first user and/or the application resident on the respective user device for the first user includes using an in-app integration and executing the application on one of the respective user device for the first user to determine a cost for and/or ability of the application to fulfill the group action to book the bookable service.

13. The method of claim 1, wherein accessing the account-accessible service associated with the first user and/or the application resident on the respective user device for the first user includes accessing the account-accessible service associated with the first user using an online service integration to determine a cost for and/or ability of the account-accessible service to fulfill the group action to book the bookable service.

14. The method of claim 1, wherein selecting the particular user device to fulfill the group action to book the bookable service is performed automatically based at least in part on the generated ranking.

15. The method of claim 1, wherein selecting the particular user device to fulfill the group action to book the bookable service is performed in response to selection by one of the plurality of users.

16. The method of claim 1, wherein selecting the particular user device to fulfill the group action to book the bookable service is performed in response to voting by multiple users among the plurality of users.

17. The method of claim 1, further comprising generating a suggestion to fulfill the group action to book the bookable service based upon interaction between at least a subset of the plurality of users, wherein identifying the set of user devices and generating the ranking are performed in response to generating the suggestion.

18. The method of claim 1, further comprising presenting the ranking to at least one of the plurality of users, wherein selecting the particular user device to fulfill the group action to book the bookable service is performed in response to user selection from the ranking presented to the at least one of the plurality of users.

19. The method of claim 1, wherein generating the ranking of the set of user devices is based at least in part on the first wait time and/or the second wait time.

20. A system comprising one or more processors and one or more memories operably coupled with the one or more processors, wherein the one or more memories store instructions that, in response to execution of the instructions by the one or more processors, cause the one or more processors to fulfill a group action to book a bookable service for a plurality of users having respective user devices by:
  detecting a query for the group action to book the bookable service using an assistant instance associated with at least one of the plurality of users, wherein the assistant instance is one of a plurality of assistant instances associated with the plurality of users and resident on respective user devices of the plurality of users;
  determining an intent for the query detected using the assistant instance, wherein determining the intent for the query includes determining that the query is for a task to be performed on behalf of the plurality of users, and performance of the task fulfills the group action to book the bookable service;
  forming an assistant cluster between the plurality of assistant instances;
  exchanging user device capabilities for the respective user devices upon which the plurality of assistant instances of the assistant cluster are resident;
  identifying, with the assistant cluster and from among the plurality of user devices, a set of user devices that are capable of fulfilling the group action to book the bookable service, wherein identifying the set of user devices is performed using the exchanged user device capabilities;
  generating a ranking of the set of user devices based at least in part on suitability of each user device in the set of user devices to fulfill the group action to book the bookable service, wherein generating the ranking of the set of user devices includes:
    accessing a first account-accessible service associated with a first user among the plurality of users and/or executing a first application resident on the respective user device among the set of user devices for the first user to retrieve a first wait time, a first charge, a first discount, a first reward, a first credit, or a first loyalty reward associated with fulfilling the group action to book the bookable service using the respective user device for the first user;
    accessing a second account-accessible service associated with a second user among the plurality of users and/or executing a second application resident on a respective user device among the set of user devices for the second user to retrieve a second wait time, a second charge, a second discount, a second reward, a second credit, or a second loyalty reward associated with fulfilling the group action to book the bookable service using the respective user device for the second user; and
    generating the ranking using the retrieved first wait time, first charge, first discount, first reward, first credit, or first loyalty reward, and using the retrieved second wait time, second charge, second discount, second reward, second credit, or second loyalty reward;
  selecting a particular user device among the set of user devices to fulfill the group action to book the bookable service based at least in part on the generated ranking; and
  initiating fulfillment of the group action to book the bookable service on the particular user device.

* * * * *